United States Patent [19]

Maruyama

[11] 4,068,869
[45] Jan. 17, 1978

[54] COUPLER

[76] Inventor: Tadaaki Maruyama, 1089-130 Nedo Abiko, Chiba, Japan

[21] Appl. No.: 696,770

[22] Filed: June 16, 1976

[30] Foreign Application Priority Data

June 16, 1975 Japan .................................. 50-71988

[51] Int. Cl.² ............................................. F16L 37/18
[52] U.S. Cl. .................................... 285/316; 285/321
[58] Field of Search ........................ 285/316, 277, 321;
137/614.04; 403/DIG. 6, DIG. 8, 316, 325, 327

[56] References Cited

U.S. PATENT DOCUMENTS

| 2,643,140 | 6/1953 | Scheiwer | 285/316 |
| 2,689,143 | 9/1954 | Scheiwer | 137/614.04 X |
| 3,168,335 | 2/1965 | Sumption | 285/316 |

FOREIGN PATENT DOCUMENTS

| 1,224,305 | 3/1971 | United Kingdom | 285/316 |

Primary Examiner—Dave W. Arola

[57] ABSTRACT

A coupler or plug adapter for quickly converting a plug, which is used in hydraulic and pneumatic units, into a socket by attaching said adapter to the plug with a simple manual coupling manner in order to enable the plug to be coupled with another plug in fluid tight relationship is disclosed.

1 Claim, 2 Drawing Figures

COUPLER

BACKGROUND OF THE INVENTION

The present invention relates to a novel coupler or plug adapter for connecting a pair of plugs used in hydraulic and pneumatic units in fluid tight relationship (hereinafter, referred to simply as the adapter).

The adapter of the present invention is used for quickly converting one of the plugs into a socket by attaching the adapter to the plug with a simple manual coupling manner in order to enable the plug to be coupled with the other plug in fluid tight relationship.

The present invention originates from the increasing demand for a suitable device which can make a plug quickly replace a socket and vice versa.

DESCRIPTION OF THE PRIOR ART

In the fields of the hydraulic and pneumatic engineerings, it is often advantageous for a plug used in the units to quickly convert itself into a socket in order to enable the plug to be coupled with another plug of such units. However, heretofore, despite the great number of patents extant on the subject, the demand for a simple, inexpensive and satisfactory, quickly attachable and detachable plug adapter for converting the plug quickly into a socket with a simple manual coupling manner as is required in the case of the conventional coupler has not been fulfilled. So, in case that the plug should be coupled with another plug, one of these plugs must be removed from the units, to which subject plug is attached, so as to alternatively attach a socket to the same units.

However, replacing the plug with the socket is a cumbersome and usually dirty hard work, during which time the units provided with the plug to be replaced with the socket must be dropped out from the total hydraulic and pneumatic line in which subject units serve its constituent elements, and thereby much waste of time and money is caused.

SUMMARY OF THE INVENTION

In view of the foregoing state of the art, it is an object of the present invention to provide a novel coupler or plug adapter for enabling the plug to be coupled with another plug in fluid tight relationship by attaching the adapter to the plug for converting the latter quickly into the socket with a simple manual coupling manner as is required in the case of the conventional coupler.

Briefly stated, the adapter of the present invention achieves the above objective by providing a pair of axially alternatively reciprocating sliding collars which are disposed symmetrically to each other. The collar is slidably disposed within an annular space defined between a pair of equal axial-length outer and inner coaxially coupled sleeves which are axially slidable with each other by a predetermined distance so as to alternatively shift the collar to its innermost position where the collar releases detent means from their locking position for enabling a plug to be disconnected from the inner sleeve forming a socket in which a pair of plugs are symmetrically coupled together through the engagement between the outer peripheral recesses of the plugs and the detent means capable of shifting from the locking position to their released position without dropping out from the socket.

For maintaining the collar in its outermost position where the detent means are locked for positively connecting the plug with the socket, bias means such as a compression spring urges the collar outwardly to abut resiliently against an external radial projection such as a relatively small snap ring fixedly mounted on the external surface of the socket adjacent to each end thereof. For driving the collar from such outermost position to its innermost position where the collar at its inward end abuts rigidly against an external shoulder of the socket, the outer sleeve of the adapter is provided with a pair of internal radial projections such as relatively large snap rings each of which is fixedly mounted on the internal surface of the outer sleeve adjacent to each end thereof and abuts against the outward end of the collar. Within the bore of the socket, sealing means such as a pair of O-rings are fixedly mounted for providing the sealing engagement between the socket and the plugs.

DESCRIPTION OF THE PREFERRED EMBODIMENT

Figure 1:
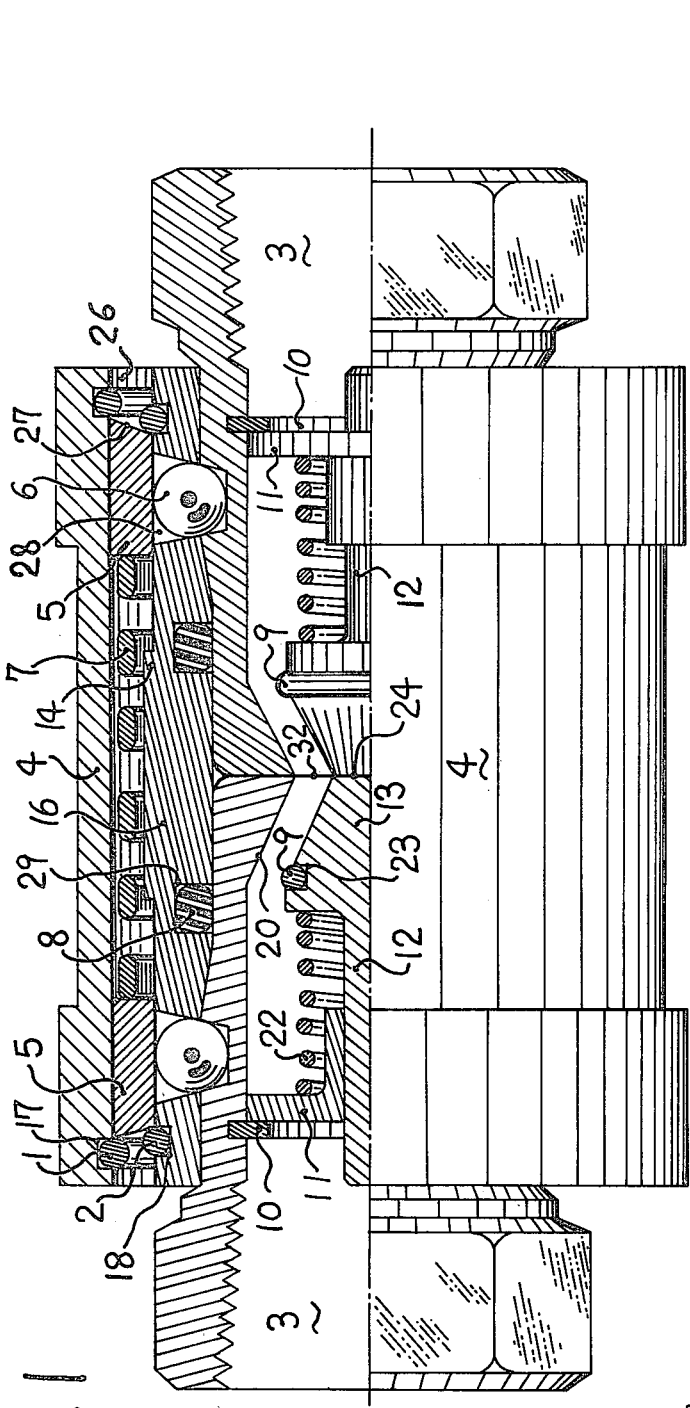
FIG. 1 is a side elevational view with upper side thereof broken away on the center line of the coupler in a connected position in both side with a pair of plugs.

Referring now to the drawings for a detailed description of the present invention wherein like reference numerals identify like parts, FIG. 1 discloses a novel coupler or plug adapter for enabling a plug 3 to be coupled with another plug 3 by attaching the adapter to one of plugs 3 to be converted into a socket with a simple manual coupling manner.

For better understanding of the present invention, the construction of the plug adapter of the present invention will be described with the description of the operation thereof.

In general, the adapter of the present invention takes a double-walled cylindrical configuration the external and internal cylindrical walls of which are formed by a sliding sleeve 4 and a stationary sleeve-like socket 16 respectively, and between such external and internal cylindrical walls 4 and 16 an intermediately disposed annular space 26 is defined and extends throughout the axial length of the adapter.

Within this annular space 26, a pair of sliding collars 5 are symmetrically disposed and limited in their outward and inward axial sliding movement relative to the socket 16 by the provisions of a pair of relatively small diameter snap rings 2 and a pair of external shoulders 14 which are integrally formed on the intermediate periphery of socket 16.

Each of snap rings 2 is fixedly mounted in an external annular narrow groove 18 which is formed on the external surface of socket 16 adjacent to each end of the same. Spaced inwardly from each of external grooves 18 are a plurality of circumferentially spaced frustoconical holes 28 for receiving a plurality of balls 6 serving as detent means radially movably so as to connect the plug 3 positively with the socket 16.

Further spaced inwardly from the holes 28 are a pair of internal annular wide grooves 29 for fixedly mounting a pair of O-rings 8 serving as sealing means therein so as to establishing a sealing engagement between plug 3 and socket 16. The collar 5 is provided with a generally frustoconically shaped cam surfce 27 at its one end for facilitating the inward movement of balls 6 when the collar 5 is released from its innermost position shown in FIG. 2 and driven toward its outermost position shown in FIG. 1 by suitable bias means such as a compression coil spring 7.

The spring 7 is interposed between the collars 5 to abut the collars 5 resiliently against the snap rings 2 at their cam surface 27. In this state, each of collars 5 can be axially reciprocated along the periphery of socket 16 between the shoulder 14 and the snap ring 2 against the resilient force of the compression spring 7.

The actual operation of the collars 5 is effected by abutting their can surfaces 27 resiliently against a pair of relatively large diameter snap rings 1 each of which is fixedly mounted in an internal annular narrow groove 17 formed on the internal surface of sleeve 4 adjacent to each end of the same. In other words, when the sleeve 4 is axially moved relative to the socket 16 by the operator so as to project the socket 16 outwardly from the sleeve 4 in one side of the adapter as shown in FIG. 2, the collar 5 of such side is axially inwardly moved toward its innermost position against the resilient force of compression spring 7 as the snap ring 1 of subject side is axially moved together with the sleeve 4 relative to the socket 16 until the inward end of collar 5 abuts rigidly against the shoulder 14 of subject side.

Figure 2:
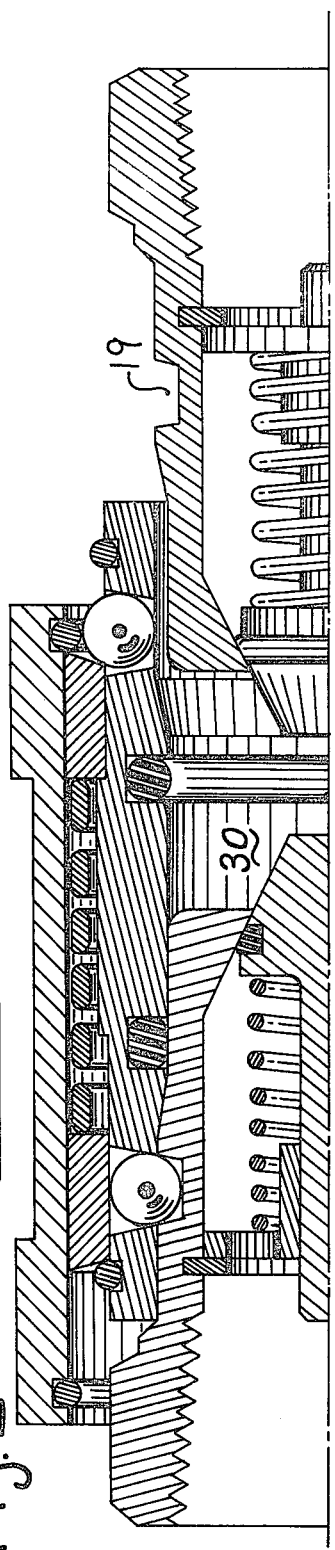
FIG. 2 is a similar view of the coupler in the connected position in one side, and in a disconnected position in the other side with one plug.

As shown in FIG. 2, when the collar 5 of subject side reaches its innermost position, the balls 6 are released from the restriction applied by the collar 5 to their radially outwardly directing movements, and thereby cleared up from a plug-receiving bore 30 of the socket for enabling the plug 3 of subject side to be disconnected from the socket 16 or to be inserted into the bore 30 for positively coupling it with the socket 16.

During such sliding operation of sleeve 4, in the opposite side of the adapter the other collar 5 is positively maintained at its original outermost position by abutting at its cam surface 27 against the snap ring 2 of socket 16 while at its inward end being outwardly urged by the compression spring 7.

If it is required in the opposite side of the adapter to disconnect the other plug 3 from the socket 16, slide sleeve 4 to the opposite direction relative to the socket 16 until the collar 5 of this side abuts at its inward end rigidly against the shoulder 14 of the socket 16 as in the case of the operation described with reference to FIG. 2.

As clearly shown in FIG. 2, the balls 6 are prevented from dropping out from the holes 28 of socket 16 in radially outward directions by abutting against the snap ring 1 of sleeve 4 at the time the collar 5 is maintained at its innermost position, and in radially inward directions by forming the inward ends of holes 28 opening into the plug-receiving bore 30 slightly smaller in diameter than the balls 6.

Thus, the plug 3 is attached to the adapter of the present invention is quickly converted into a socket for enabling the plug 3 to be coupled with another plug 3 as shown in FIG. 2. In this embodiment, the plug 3 is shown as equipped with a check valve, however, such valve is not necessarily required, and the plug 3 itself does not pertain to the present invention.

Therefore, hereinafter it will be incidentally described as to the construction of the plug 3.

The plug 3 is positively coupled with the socket 16 by holding the balls 6 in an external annular groove 19 of plug 3 and maintains a sealing engagement to the socket 16 by engaging its front periphery to the O-ring 8.

As shown in FIG. 1, the valves of a pair of plugs 3 engage to each other at their flat end surfaces 24 to open a passage 32 when the plugs 3 are brought into operative relation with the coupler of the present invention. If the coupling is broken, both of the valves are closed as shown in FIG. 2 by abutting an O-ring 9, which is mounted in an external annular groove 23 of a valve head 13, against a frustoconical valve seat 20 formed integrally on the front internal surface of plug 3 through the influence of axially expanding force exerted by a compression coil spring 22. The spring 22 is coaxially interposed between the rear end valve head 13 and a spider 11, which is fixedly held within the plug 3 by a snap ring 10 and slidably receives a valve stem 12 therein.

While the specific embodiment of the present invention illustrates a plurality of balls 6 providing detent means for the coupler, it will be understood that pins or rollers may be substituted therefor, so, it will be understood that the present invention is not limited thereto as many variations will be apparent to those skilled in the art, and the invention is to be given its broadest interpretation within the terms of the following claim.

I claim:

1. A coupler for connecting a pair of plugs (3) in fluid tight relationship comprising in combination:
    an outer sliding sleeve (4) provided with a pair of internal annular narrow grooves (17) each of which is formed on the internal surface of said sleeve (4) adjacent to each end thereof,
    an inner stationary sleeve forming a socket (16) having a pair of external annular narrow grooves (18) each of which is formed on the external surface of said socket (16) adjacent to each end thereof, a plurality of circumferentially spaced detent means-receiving holes (28) which are disposed axially inwardly adjacent to said external narrow grooves (18), a pair of external radial shoulders (14) axially inwardly spaced from said holes (28) for limiting the inward movement of a pair of axially sliding collars (5) with respect to said socket (16),
    a pair of axially sliding collars (5), each of which is provided with a frustoconical cam surface (27) at its one end, mounted coaxially slidably within an annular space (26) defined between said sliding sleeve (4) and said stationary socket (16), and disposed symmetrically to each other with respect to said shoulders (14) so as to face the outside at said cam surfaces (27),
    detent means (6) radially movably received in said holes (28) to connect said plug (3) positively with said socket (16) when said collar (5) is positioned over said detent means thereby preventing said detent means (6) from moving radially outwardly after said plug (3) is fully inserted into said socket (16) and to disconnect said plug (3) from said socket (16) when said collar (5) is axially inwardly moved toward its innermost position adjacent to said shoulder (14) thereby being positioned away from said detent means for releasing said detent means (6) from their locking position,
    a pair of relatively large diameter snap rings (1) mounted in said internal narrow grooves (17) for providing internal radial projections which serve as means for driving said collars (5) to right and left along the periphery of said socket (16),
    a pair of relatively small diameter snap rings (2) mounted in said external narrow grooves (18) for providing external radial projections which serve as means for limiting the outward movement of said collars (5) with respect to said socket (16), bias means (7) for biasing said collars (5) outwardly so as to make said collars (5) abut resiliently against said snap rings (1 and 2) at said cam surfaces (27), sealing means (8) fixedly mounted in said socket (16) inwardly beyond said holes (28) for establishing sealing engagement between said socket (16) and plugs (3).

* * * * *